United States Patent [19]

Lin et al.

[11] 4,060,658

[45] Nov. 29, 1977

[54] GLASS FIBERS COATED WITH A POLYBUTADIENE HOMOPOLYMER LATEX-CONTAINING IMPREGNANT

[75] Inventors: Kingso C. Lin; Donald J. Hammond, both of Newark, Ohio

[73] Assignee: Owens-Corning Fiberglas Corporation, Toledo, Ohio

[21] Appl. No.: 615,006

[22] Filed: Sept. 19, 1975

[51] Int. Cl.² .................. B32B 9/00; D02G 3/00
[52] U.S. Cl. .................. 428/378; 260/28.5 B; 428/375; 428/392
[58] Field of Search ............. 428/375, 378, 391, 392; 260/28.5 B, 28.5 R

[56] References Cited

U.S. PATENT DOCUMENTS

| | | |
|---|---|---|
| 3,424,608 | 1/1969 | Marzocchi et al. .................. 428/288 |
| 3,513,049 | 5/1970 | Marzocchi ....................... 428/392 X |
| 3,533,830 | 10/1970 | Marzocchi ....................... 428/392 X |
| 3,533,830 | 10/1970 | Marzocchi et al. ............. 428/378 X |
| 3,705,073 | 12/1972 | Marzocchi et al. ................. 428/378 |
| 3,787,224 | 1/1974 | Uffner ............... 428/378 X |
| 3,826,074 | 7/1974 | Uffner ............... 428/392 X |
| 3,837,898 | 9/1974 | McCombs ................ 260/29.7 GP X |
| 3,914,499 | 10/1975 | Siefert ............... 428/391 X |

*Primary Examiner*—Lorraine T. Kendell
*Attorney, Agent, or Firm*—Philip R. Cloutier; Ronald C. Hudgens; Dennis M. Kozak

[57] ABSTRACT

A tire cord impregnant, particularly suited for coating glass fibers is disclosed. The impregnant consists essentially of a vinylpyridine latex, a polybutadiene latex, a wax emulsion and a resorcinolformaldehyde resin solution.

8 Claims, No Drawings

GLASS FIBERS COATED WITH A POLYBUTADIENE HOMOPOLYMER LATEX-CONTAINING IMPREGNANT

This invention relates to tire cord impregnants.

In one of its more specific aspects, this invention relates to a glass tire cord in combination with an impregnant particularly suitable for glass tire cord. The use of this impregnant results in a substantial improvement in the bond between the elastomer and the cord.

The use of elastomeric products reinforced with fibers, and particularly glass fibers, is well known. Such products are employed as vehicular tires, drive belts, conveyor belts and the like.

As related to the use of glass fibers, the fibers are usually sized as formed and the individual fibers are plied with other strands and twisted to form yarns, threads or cords. The plurality of strands is then impregnated, usually with a latex derivative compatible with the elastomer. The strands are then dried to set the impregnant on the external surface of the glass bundle and thereafter are cured.

Various type tire cord impregnants can be used. Generally, these comprise combinations of resorcinol-formaldehyde resins in combinations with various latexes such as neoprene rubber latex, butadiene latex and the like. In many such impregnants, neoprene rubber latex is a major component.

While the impregnant of this invention is employable with any reinforcing medium such as natural fibers, synthetic fibers, glass fibers and steel, its employment will be discussed herein in relation to glass fibers without intending to limit the invention thereto.

The impregnant of this invention is useable with any glass fibers. Preferably, it is used with E fibers having a diameter in the range of from about 0.35 to about 0.50 mil. The glass can be unsized or sized with conventional sizing employed for elastomer reinforcement.

The term "glass fibers" as used herein shall mean continuous fibers formed by rapid attenuation of a multiplicity of streams of molten glass and to strands formed when such continuous glass fiber filaments are gathered together in forming. The term shall also mean yarns and cords formed by plying and/or twisting a multiplicity of strands together and to woven and non-woven fabrics which are formed of such glass fiber strands, yarns or cords.

The term "glass fibers" shall also apply to discontinuous fibers formed by high pressure steam or air directed onto multiple streams of molten glass and to yarns that are formed when such discontinuous fibers are allowed to rain down onto a surface from which the fibers are gathered together to form a sliver which is drafted into a yarn. The term shall also refer to woven and non-woven fabrics formed of such yarns of discontinuous fibers and to combinations of such continuous and discontinuous fibers in strand, yarn cord and fabric formed therefrom.

As used herein, the term "elastomer" shall include natural rubber in the cured and uncured state, vulcanized or unvolcanized and synthetic organic elastomeric materials such as butadiene-styrene copolymer, butadiene-acrylonitrile copolymer, chloroprene, isoprene, neoprene, isobutyl rubber and the like and elastomeric polymers and copolymers in their cured and uncured and vulcanized and unvulcanized stages.

In its preferred embodiment, the invention comprises at least one glass fiber coated with a residue obtained by drying an aqueous composition consisting essentially of a resorcinol-formaldehyde resin, a vinylpyridine terpolymer, a butadiene latex and a wax emulsion. The composition contains substantially no neoprene latex.

In another embodiment of the invention, a polymer such as styrene-butadiene copolymer latex is employed to replace, as a minor component, a portion of the butadiene latex.

In another embodiment of the invention, a nitrile-butadiene latex is employed to replace a portion of the butadiene latex.

Any suitable resorcinol-formaldehyde resin pre-condensate can be employed. Preferably, it will be produced employing from about 0.2 to about 0.8 mol of formaldehyde per mole of resorcinol and will contain a total solids content of about 75 weight percent. The resorcinol-formaldehyde resin pre-condensate will be employed in the composition in an amount within the range of from about 3 to about 4 weight percent of the dried composition. In the preferred embodiment, it will be employed in an amount of about 3 weight percent of the dried residue.

A suitable pre-condensate can be formed as demonstrated hereinafter and suitable materials are available commercially, some being Schenectady SRF 1524 available from Schenectady Chemicals, Penacolite R2170 and R2200 available from Koppers Co., Inc., Pittsburgh, Pa. and Arofene 779 available from Ashland Chemical Co., Columbus, Ohio.

Any suitable vinylpyridine terpolymer can be employed. Preferably, it will be a terpolymer latex of butadiene-styrene and vinylpyridine comprised of about 70 weight percent butadiene, about 15 weight percent styrene and about 15 weight percent vinylpyridine. This material will be employed in an amount within the range of from about 10 to about 60 weight percent of the dried composition. In the preferred embodiment, the terpolymer will be employed in an amount of about 30 weight percent.

One particularly suitable vinylpyridine is Firestone FRS-5997 available from Firestone Synthetic Rubber and Latex Co. This material is a terpolymer latex of butadiene, styrene and vinylpyridine containing, by weight, 70% butadiene, 15% styrene and 15% vinylpyridine.

Any suitable polybutadiene latex can be used. Preferably, it will be a polybutadiene latex having a molecular weight within the range of from about 10,000 to about 2,000,000. This latex will be employed in an amount within the range of from about 30 to about 80 weight percent of the dried composition. In the preferred embodiment of the invention the polybutadiene latex will be employed in the amount of 60 weight percent of the impregnant.

Particularly suitable polybutadiene latexes are SR-5841 and SR-272 available from Firestone Synthetic Rubber and Latex Co., Akron, Ohio.

Any suitable wax emulsion can be employed in the impregnant. Preferably, the wax emulsion will contain about 75 weight percent paraffin wax and about 25 weight percent microcrystalline wax. The wax emulsion will be contained in the composition in an amount within he range of from about 4 to about 6 weight percent of the dried composition. In the preferred embodiment, the wax emulsion will be contained in the impregnant in an amount of about 5 weight percent of the dried impregnant.

One particularly suitable wax emulsion is Vultex Wax Emulsion No. 15 available from General Latex and Chemical Corp., Cmbridge, Mass.

If a styrene-butadiene copolymer latex is employed to replace a portion of the butadiene latex, the styrene-butadiene copolymer will be employed in the dried impregnant in an amount up to about 50 weight percent. The styrene-butadiene copolymer will preferably be formed from about 25 parts by weight of styrene and about 35 parts by weight of butadiene.

Suitable styrene-butadiene copolymer latexes are commercially available.

If a nitrile-butadiene latex is employed to replace a portion of the butadiene latex, the nitrile-butadiene latex will be employed in an amount up to about 50 weight percent of the dried impregnant. The nitrile-butadiene will preferably be formed from about 65 parts by weight of acrylonitrile and about 35 parts by weight of butadiene.

Suitable nitrile-butadiene latexes are commercially available.

The dried impregnant of this invention can also contain about 1 weight percent formaldehyde, about 0.8 weight percent ammonium hydroxide and about 0.1 weight percent potassium hydroxide.

If desired, other latexes can be used to replace a portion of the butadiene latex. For example, either styrene-butadiene copolymer latex or nitrile-butadiene copolymer latex can be substituted for a portion of the polybutadiene latex in an amount up to about 50 weight percent of the latter.

The following example demonstrates the procedure employed to produce the impregnant of this invention and is based upon the preparation of a quantity of 100 gallons of the impregnant.

EXAMPLE I

A resorcinol-formaldehyde resin premix solution was prepared by charging 25.7 pounds of deionized water into a premix tank and adding 25.7 pounds of commercial resorcinol-formaldehyde permix. The mixture was agitated for five minutes. Formaldehyde in an amount of 7.7 pounds was added and agitation was continued for thirty minutes. Thereupon 25.7 pounds of deionized water containing 5.2 pounds of potassium hydroxide were added and agitation was continued for 20 minutes.

Into a main mix tank, 463.2 pounds of a commercial butadiene-styrene-vinylpyridine latex were introduced. 231.6 pounds of commercial polybutadiene latex were introduced into the mix tank with agitation. The previously-prepared resorcinol-formaldehyde resin premix was then introduced into the main mix tank over a period of 4 to 6 minutes. Mixing was continued thereafter for ten minutes.

After aging for about two hours, the impregnant was suitable for use. It has a pH of about 9, a viscosity of about 23 cps, and a total solids content of about 43 weight percent.

The impregnant of this invention is applied to the glass fibers in the usual manner, for example employing the procedure and apparatus disclosed in U.S. Pat. No. 3,424,608 to A. Marzocchi et al.

After application of the impregnant to the glass strand, the coating is air dried and cured in the usual manner, that is, for example, at 500° to 650° F for a period of about 5 to 10 seconds.

The glass fiber, or fibers, having the impregnant on at least a portion of its surface, can then be converted in yarns, rovings or fabrics in the form of packages and the like.

EXAMPLE II

The following data demonstrate the effect of various levels of vinylpyridine terpolymer content and butadiene content on the impregnant of this invention when employed in various embodiments of the invention and applied to substantially identical glass strands.

| Composition, Wgt. % | Impregnant | | |
|---|---|---|---|
| | I | II | III |
| Resorcinol-Formaldehyde | 3.3 | 3.3 | 3.3 |
| Formaldehyde | 1.0 | 1.0 | 1.0 |
| Vinylpyridine Terpolymer | 60 | 30 | 10 |
| Polybutadiene Latex | 30 | 60 | 80 |
| Wax Emulsion | 5.3 | 5.3 | 5.3 |
| Neoprene Latex | 0 | 0 | 0 |
| Strand Properties | | | |
| Loss on Ignition, Wgt. % | 17.0 | 17.2 | 18.0 |
| Tensile Strength at Break, # | 71 | 70 | 71 |
| Hot U Adhesion, # | 35 | 34 | 33 |
| Hot Strip Adhesion # | 33 | 35 | 33 |

It will be seen from the above data that the terpolymer content and the butadiene latex content can be varied over a wide range while the resulting glass strand still possess satisfactory properties for use as tire cord.

EXAMPLE III

The following data demonstrate the effect of substituting styrene-butadiene latex for the polybutadiene latex at substantially constant vinylpyridine latex contents.

| Composition, Wgt. % | Impregnant | | | | |
|---|---|---|---|---|---|
| | I | II | III | IV | V |
| Polybutadiene Latex | 30 | 36 | 42 | 48 | 54 |
| Styrene-butadiene Latex | 30 | 24 | 18 | 12 | 6 |
| Vinylpyridine Terpolymer | 30 | 30 | 30 | 30 | 30 |
| Neoprene Latex | 0 | 0 | 0 | 0 | 0 |
| Strand Properties | | | | | |
| Loss on Ignition, % | 16.2 | 17.9 | 17.8 | 16.1 | 17.7 |
| Tensile Strength at Break, # | 77 | 67.9 | 65.2 | 73.2 | 67.9 |
| Hot U Adhesion, # | 36 | 36 | 38 | 35.6 | 36.3 |
| Hot Strip Adhesion, # | 30 | 32 | 31 | 34 | 32 |

The above properties were determined after 1 day aging.

The above data indicate that styrene-butadiene latex can be substituted for the polybutadiene latex over a wide range with the resulting glass strand still possessing satisfactory properties for use as tire cord.

The following data present a comparison between the impregnant of the subject invention and that of U.S. Pat. No. 3,424,608 to Marzocchi et al. The impregnant of the patent employs neoprene as one of its major components with the butadiene latex being one of the minor components.

In contrast, the impregnant of the present invention contains butadiene latex as a major component and contains substantially no neoprene. The composition of the impregnant given below represents the preferred embodiment of the impregnant of this invention.

| Composition, Wgt. % | Impregnant | |
|---|---|---|
| | U.S. Pat. 3,424,608 | Invention |
| Resorcinol-Formaldehyde Resin | 2 – 10 | 3.4 |

| -continued | | |
|---|---|---|
| Vinylpyridine terpolymer | 15 – 50 | 30.4 |
| Polybutadiene latex | 5 – 15 | 60.9 |
| Neoprene latex | 25 – 50 | 0 |
| Wax Emulsion | 0 | 5.3 |
| Strand Properties | | |
| Loss on Ignition, Wgt. % | 16.7 | 17.2 |
| Tensile Strength at Break, # | 58 | 70 |
| Hot U Adhesion, # | 28 | 34 |
| Hot Strip Adhesion, # | 33 | 35 |

It will be seen from the above that the substantial absence of neoprene latex and the presence of wax in the impregnant of the invention results in an impregnant superior to that of the prior art.

It can be seen from the above that various modifications can be made to the present invention. Such, however, are considered as being within the scope of the invention.

What is claimed is:

1. Glass fibers in contact with the residue produced by removing water from a composition consisting essentially of a vinylpyridine-butadiene-styrene terpolymer, a polybutadiene homopolymer latex, a wax emulsion and a resorcinol-formaldehyde resin, with the polybutadiene homopolymer being present in an amount within the range from aboout 30 to about 80 weight percent.

2. Glass fibers of claim 1 in which said vinylpyridine terpolymer is comprised of about 70 weight percent butadiene, about 15 weight percent styrene and about 15 weight percent vinylpyridine.

3. Glass fibers of claim 1 in which said wax emulsion contains about 75 weight percent paraffin wax and about 25 weight percent microcrystalline wax.

4. Glass fibers of claim 1 in which said vinylpyridine terpolymer is contained in said residue in an amount within the range of from about 10 to about 60 weight percent, said polybutadiene latex is contained in an amount within the range of from about 30 to about 80 weight percent, said wax emulsion is contained in an amount within the range of from about 4 to about 6 weight percent and said resorcinol-formaldehyde resin is contained in an amount within the range of from about 3 to about 4 weight percent.

5. Glass fibers of claim 1 in which said fiber is accumulated in the form of a package.

6. An elastomer reinforced with the glass fibers as defined in claim 1.

7. A plurality of glass fibers and an impregnant for the glass fibers, said impregnant being a residue formed by removing water from a composition consisting essentially of a vinylpyridine-butadiene-styrene terpolymer, a polybutadiene homopolymer latex, a wax emulsion and a resorcinol-formaldehyde resin, with the polybutadiene homopolymer being present in an amount within the range from about 30 to about 80 weight percent.

8. Glass fibers as defined in claim 7 wherein the wax emulsion contains 75% by weight paraffin wax and 25% by weight microcrystalline wax.

* * * * *